(12) United States Patent
Yoneoka

(10) Patent No.: US 7,249,922 B2
(45) Date of Patent: Jul. 31, 2007

(54) JOINTING MEMBER FOR FIXING PANEL MEMBERS BY ONE-TOUCH OPERATION

(75) Inventor: Akira Yoneoka, Kanagawa (JP)

(73) Assignee: Piolax, Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 10/790,217

(22) Filed: Mar. 2, 2004

(65) Prior Publication Data

US 2004/0175250 A1    Sep. 9, 2004

(30) Foreign Application Priority Data

Mar. 3, 2003    (JP)    ............... 2003-056429

(51) Int. Cl.
*F16B 13/06*    (2006.01)
(52) U.S. Cl. .............. 411/45; 411/41; 411/48; 411/51
(58) Field of Classification Search .............. 411/41, 411/45, 46, 48, 60.1
See application file for complete search history.

(56) References Cited

U.S. PATENT DOCUMENTS

| | | | | | |
|---|---|---|---|---|---|
| 4,276,806 | A | * | 7/1981 | Morel | 411/46 X |
| 4,874,276 | A | * | 10/1989 | Iguchi | 411/48 |
| 5,211,519 | A | * | 5/1993 | Saito | 411/45 |
| 5,286,152 | A | * | 2/1994 | Anderson | 411/45 |
| 5,370,484 | A | * | 12/1994 | Morikawa et al. | 411/48 |
| 5,568,675 | A | | 10/1996 | Asami et al. | |
| 5,632,581 | A | * | 5/1997 | Hasada | 411/48 |
| 5,846,040 | A | * | 12/1998 | Ueno | 411/45 |
| 5,850,676 | A | * | 12/1998 | Takahashi et al. | 24/297 |
| 6,039,523 | A | * | 3/2000 | Kraus | 411/48 |
| 6,045,309 | A | * | 4/2000 | LeVey | 411/45 |
| 6,048,147 | A | * | 4/2000 | Arisaka et al. | 411/48 |
| 6,287,043 | B1 | * | 9/2001 | Kraus | 403/297 |
| 6,324,731 | B1 | * | 12/2001 | Pliml, Jr. | 24/453 |
| 6,364,586 | B1 | * | 4/2002 | Okada | 411/41 |
| 6,398,473 | B1 | * | 6/2002 | Kraus | 411/508 |
| 6,481,942 | B2 | * | 11/2002 | Tanaka | 411/45 |
| 6,511,273 | B2 | * | 1/2003 | Arisaka | 411/48 |
| 6,514,024 | B2 | * | 2/2003 | Akema et al. | 411/41 X |
| 2002/0001513 | A1 | * | 1/2002 | Tanaka | 411/45 |

FOREIGN PATENT DOCUMENTS

JP    8-334109    12/1996

OTHER PUBLICATIONS

Chinese Office Action dated Dec. 3, 2004 with an English translation.

* cited by examiner

*Primary Examiner*—Katherine Mitchell
(74) *Attorney, Agent, or Firm*—McGinn IP Law Group, PLLC

(57) ABSTRACT

A jointing member has a grommet and a pin. The grommet includes a flange portion and a leg portion capable of being opened, in which an insertion hole is formed from the center of the flange portion to the inner portion of the leg portion, and an engagement portion is formed at the inner surface of the leg portion. The pin includes a head portion and a shaft portion to be inserted into the insertion hole, in which an engagement surface and a lock surface each engaging with the engagement portions are formed at the shaft portion. In the jointed and fixed state of panel members, when an unexpected external force is applied to the tip end of the shaft portion of the pin, the engagement portion engages with the lock surface of the pin.

19 Claims, 5 Drawing Sheets

JOINTING MEMBER FOR FIXING PANEL MEMBERS BY ONE-TOUCH OPERATION

BACKGROUND OF THE INVENTION

1. Field of the Invention

The present invention relates to a jointing member which is configured from a grommet and a pin, in which two panel members can be at least jointed from one direction to fix the two panel members by one-touch operation.

2. Description of the Related Art

Conventionally, although not shown concretely, a jointing member is configured from a grommet and a pin. Each of these is integrally made of composite resin. The grommet has a flange portion and a leg portion, in which an insertion hole to insert a shaft portion of the pin described later therein is formed from a center of the flange portion to an inner portion of the leg portion. The leg portion is divided into plural pieces through slits so that the pieces can be opened outward, and an engagement portion which engages with a large-diameter groove of the pin described later is formed at an inner surface of each of the divided leg pieces. The pin has a head portion and a shaft portion, in which the large-diameter groove which engages with the engagement portion is formed at an almost center portion of the shaft portion and a small-diameter groove which receives the engagement portion is formed at an insertion end of the shaft portion (see JP-A-8-334109, for example).

At the time of actually using the jointing member, when the shaft portion of the pin is inserted into the insertion hole of the grommet so that each engagement portion of the respective divided leg pieces is received within the small-diameter groove of the pin. The divided leg pieces are prevented from being opened outward and only the pin is provisionally engaged on a grommet side. In this state, after the grommet is attached to attachment holes, which are previously perforated at the two panel members, the pin in the provisionally engaged state is completely pushed into the insertion hole of the grommet. Then, each engagement portion of the divided leg pieces is disengaged from the small-diameter groove and is engaged with the large-diameter groove so that the divided leg pieces are opened outward, whereby the two panel members are jointed and fixed to each other.

JP-A-8-334109 is known as a related art.

However, in the conventional jointing member, when the jointing and fixing procedure of the two panel members is completed, the insertion end of the shaft portion of the pin largely protrudes outward from the end edges of the divided leg pieces. Thus, when another procedure is performed at the rear side of the protruded insertion end, if the worker erroneously pushes the insertion end of the shaft portion of the protruded pin or another part is abutted against the insertion end of the shaft portion of the protruded pin at the time of attaching the another part, the jointing member may be disengaged from the attachment holes of the panel members or the pin may be restored to the provisionally engaged state despite that the jointing member is not disengaged. Therefore, it is required to perform the jointing and fixing procedure of the panel members again or the panel members may be transferred to the next procedure without being noticed that the jointed and fixed state of the panel members is cancelled.

SUMMARY OF THE INVENTION

A first aspect of the invention provides a jointing member having a grommet and a pin, wherein the grommet includes a flange portion and a leg portion capable of being opened, in which an insertion hole is formed from a center of the flange portion to an inner portion of the leg portion, in which a lower end of the leg portion is opened, and an engagement portion is formed at an inner surface of the leg portion. The pin includes a head portion and a shaft portion to be inserted into the insertion hole, in which an engagement surface and a lock surface each engagable with the engagement portions are formed at the shaft portion.

In a second aspect of the invention, in a state where the engagement portion formed at the leg portion of the grommet engages with the engagement surface formed at the shaft portion of the pin, the pin is movable in its drawing out direction within the insertion hole of the grommet.

In a third aspect of the invention, the engagement portion formed at the leg portion of the grommet engages with the lock surface formed at the leg portion of the shaft portion as the engagement portion moves along the lock surface while maintaining the opened state of the leg portion of the grommet.

In a fourth aspect of the invention, in a state where the engagement portion formed at the leg portion of the grommet engages with the engagement surface formed at the shaft portion of the pin, an insertion end of the shaft portion of the pin is buried within the insertion hole of the grommet.

According to the first aspect of the invention, when the shaft portion of the pin is inserted into the insertion hole of the grommet to engage the engagement portion formed at the leg portion of the grommet with the engagement surface formed at the shaft portion of the pin, the leg portion of the grommet opens outward. Thus, the panel members are jointed and fixed to each other. In this state, when an unexpected external force is applied to the insertion end of the shaft portion of the pin and the pin is pushed in its drawing out direction, the engagement portion engages with the lock surface formed at the shaft portion of the pin. Thus, such a matter can be prevented effectively from occurring that the jointing member itself disengages from the attachment holes of the panel member or the pin restores to a provisionally engaged state even if the jointing member itself does not disengage. As a result, the jointed and fixed state between the panel members can be obtained with reliability.

According to the second aspect of the invention, when an unexpected external force is applied to the tip insertion end of the shaft portion of the pin in a state where the panel members are jointed and fixed to each other, that is, a state where the engagement portion engages with the engagement surface, the pin moves in its drawing out direction within the insertion hole of the grommet. Thus, an impact energy due to the unexpected external force can be absorbed effectively. Further, at the time of removing the jointing member which joints and fixes the panel members, since the insertion end of the disengaging jig can be inserted with a small force between the head portion of the pin and the flange portion of the grommet, the head portion and the flange portion are prevented from being damaged. Further, the joining member itself can be restored to a provisionally engaged state by drawing out the grommet from the pin. According to the third invention, the leg portion of the grommet can be kept in the opened state even in a state where the engagement portion engages with the lock surface. Thus, even if an unexpected external force is applied, the jointing member itself does not move out of the attachment holes of the panel members. According to the fourth invention, in a state where the panel members are jointed and fixed to each other, that is, a state where the engagement portion engages with the engagement surface, the insertion end of the shaft portion of the pin is buried within the insertion hole of the grommet. Therefore, an unexpected external force is hardly applied.

A fourth aspect of the invention provides a jointing member having a grommet and a pin. The grommet includes a flange portion and a leg portion capable of being opened, in which an insertion hole is formed from a center of the flange portion to an inner portion of each leg portion, and an engagement portion is formed at an inner surface of the leg portion. The pin includes a head portion and a shaft portion to be inserted into the insertion hole, in which an engagement surface and a lock surface each engaging with the engagement portions of the leg portions are formed at the shaft portion. The flange portion of the grommet has a large-diameter portion adjacent to an upper end of the insertion hole, an engagement hole adjacent to a bottom portion of the large-diameter portion, and an extending portion which is extended to form a pin hole portion. The diameter of the pin hole portion is smaller than a diameter of the large-diameter portion on a side of the grommet, which is opposite to a side of the grommet on which the flange portion is formed. The shaft portion has an engagement surface which holds the engagement portion displaced to a radially outward direction to keep the leg portion of the grommet in an opened state, in a state that the pin is incorporated into the grommet, in parallel with a center line of the shaft portion and in a direction of the center line of the shaft portion for a predetermined length. The shaft portion has a lock surface which, protrudes in a radially outward direction in an insertion end of the shaft portion so as to prevent the engagement portion from falling away from the engagement surface to shift to a state that a diameter of the leg portion becomes small. The engagement portions of the grommet, and the engagement surface of the pin and the lock surface of the pin, are located relative to each other in an axial direction on the shaft such that the grommet and the pin are capable of sliding a predetermined distance when the leg portion is opened by the pin location within the grommet opening. Thus, since the extending portion is provided, a protrusion length of the shaft portion of the pin is shortened. Therefore, the grommet and the pin can be prevented from being falsely disengaged.

In a fifth aspect of the invention, the insertion end of the shaft portion of the pin, which is provided with the lock surface, is surrounded with the extending portion of each of leg portions of the grommet in a state that the grommet and the pin are incorporated so that the leg portions are opened, and is inside the insertion hole portion of the grommet.

In a sixth aspect of the invention, the predetermined distance that the grommet and the pin are enabled to slide is 0.5 mm to 2 mm. Therefore, in order to disengage the pin, it is possible to hitch with a tip of a finger or a tip of a slotted screw driver, as well as it is possible to design the jointing member to be compact in the entire length.

DETAILED DESCRIPTION OF THE PREFERRED EMBODIMENTS

Figure 1:
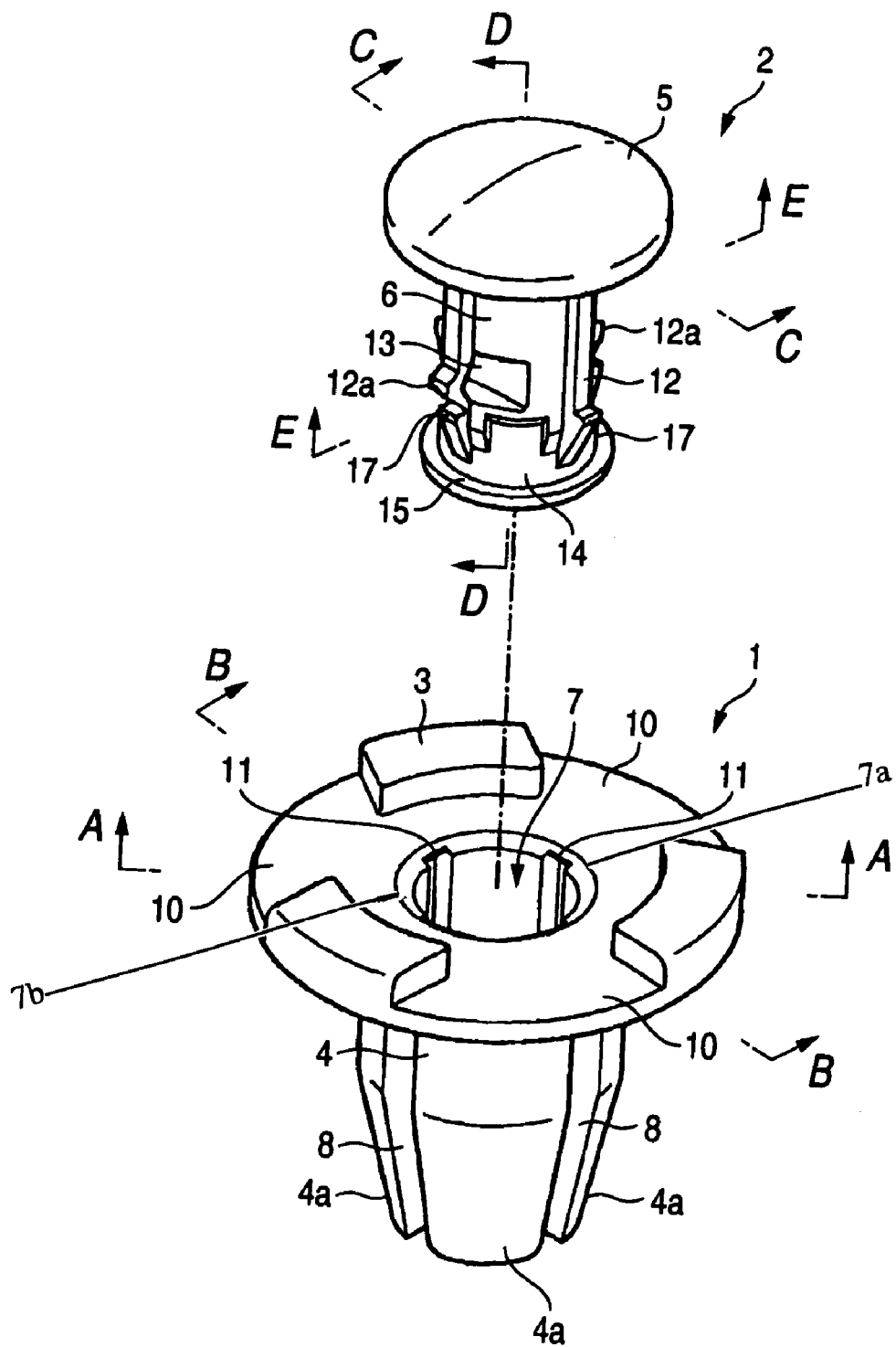
FIG. 1 is an exploded perspective view of a jointing member according to an embodiment of the invention.

An embodiment of the invention will be explained with reference to the drawings. As shown in FIG. 1, a jointing member of the embodiment (similar to the conventional jointing member) is also configured from a grommet 1 and a pin 2. Each of these is integrally made of composite resin. The grommet 1 has a flange portion 3 in a large disc shape and a cylindrical leg portion 4. The pin 2 has a head portion 5 in a small disc shape and a shaft portion 6 in a column shape.

Figure 2A:
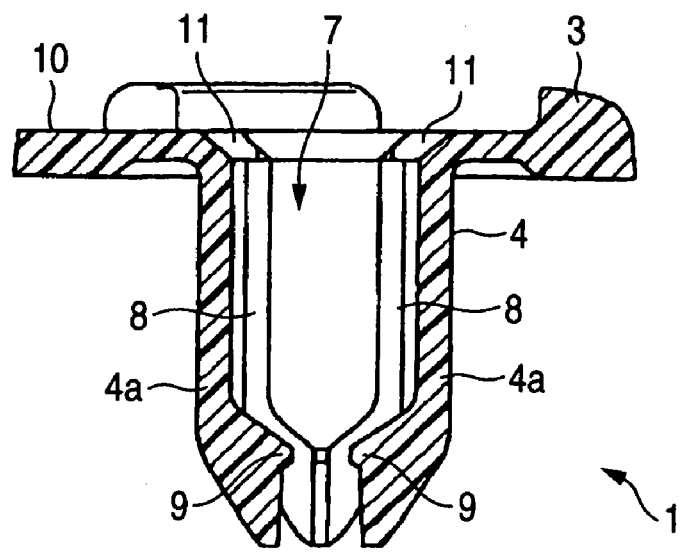
FIG. 2A is a sectional view along a line A—A in FIG. 1
Figure 2B:
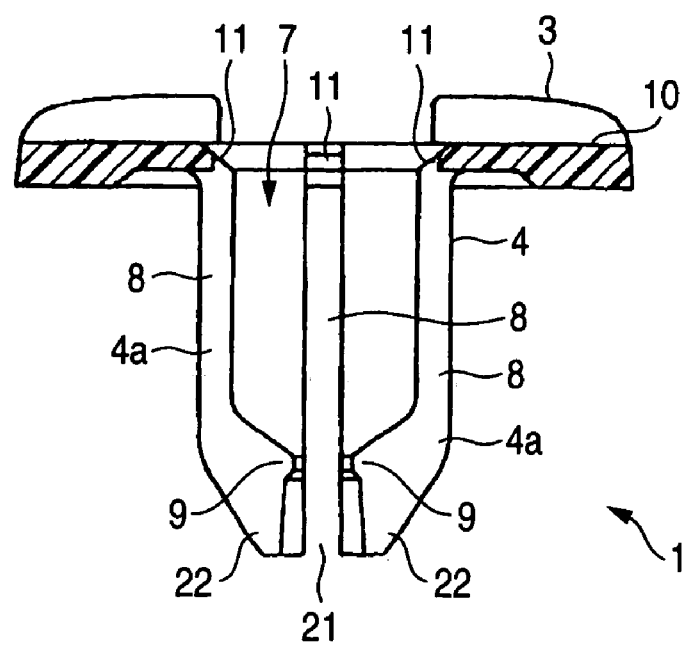
FIG. 2B is a sectional view along a line B—B in FIG. 1.

As shown in FIGS. 2A and 2B, in the grommet 1, an insertion hole 7 to insert the shaft portion 6 of the pin 2 therein is formed from a center of the flange portion 3 to an inner portion of the leg portion 4. The insertion hole 7 includes a large diameter portion 7a and a smaller diameter portion 7b (e.g., see FIG. 1). The leg portion 4 is divided into plural pieces through four slits 8 so that the pieces can be opened outward. An engagement portion 9 which engages with a engagement surface 14 and a lock surface 15 of the pin 2 described later is formed at the inner surface of an expanded tip end side of each of the divided leg pieces 4a. A plurality of tool insertion grooves 10 extending in the radial direction are formed on the upper surface of the flange portion 3. A projection 11 for provisional engagement is formed at the hole edge on the flange portion 3 side of each of the slits 8. An extending portion 22 is provided to be extended to form a pin hole portion 21 at the insertion end of the leg portion 4.

Figure 3A:
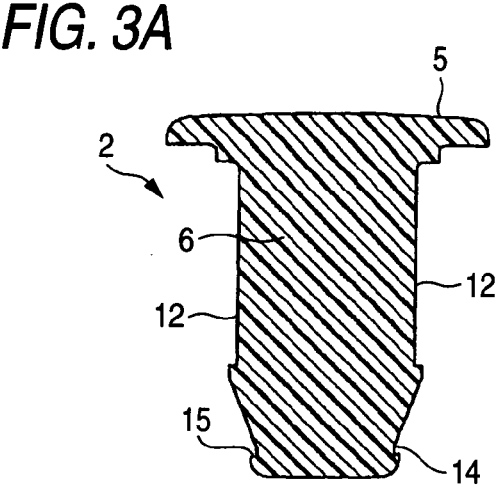
FIG. 3A is a sectional view along a line C—C in FIG. 1.
Figure 3B:
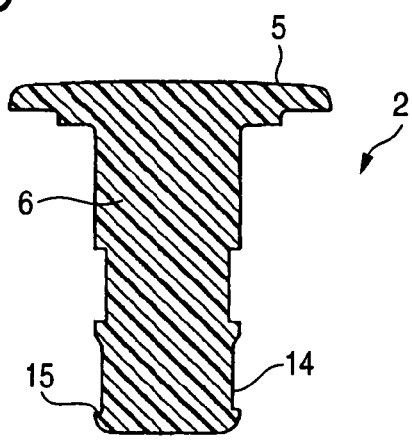
FIG. 3B is a sectional view along a line D—D in FIG. 1
Figure 3C:
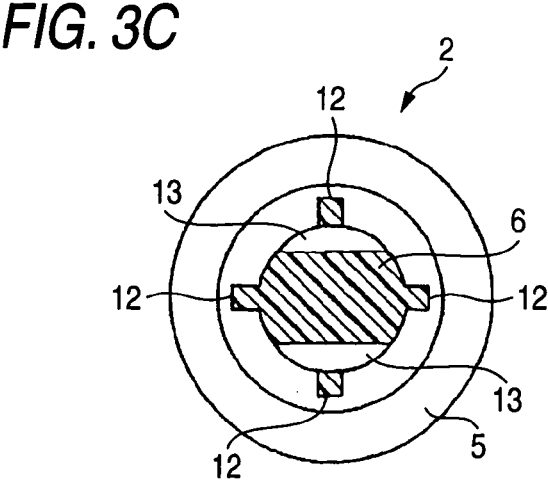
FIG. 3C is a sectional view along a line E—E in FIG. 1.

As shown in FIGS. 3A–3C, in the pin 2, four rib walls 12 which are respectively fit into and engaged with the slits 8 are formed on the outer periphery of the shaft portion 6. A bent-shaped elastic arm portion 12a, which rear surface side forms an empty portion 13, is continuously formed on the way of each of two rib walls 12 which are disposed in an opposite manner to each other. The engagement surface 14 which is in parallel to the axial direction of the shaft portion 6 is formed on the outer periphery of the shaft portion 6 on the insertion end of the pin, and the lock surface 15 which extends in a direction perpendicular to the engagement surface 14 is independently formed on the outer periphery on the insertion end of the pin continuing to the engagement surface 14.

In this embodiment, when the shaft portion 6 of the pin 2 is inserted into the insertion hole 7 of the grommet 1, the shaft portion 6 of the pin 2 is inserted until the head portion 5 of the pin 2 abuts against the flange portion 3 of the grommet 1 so that the aforesaid engagement portion 9 is engaged with the engagement surface 14 formed at the shaft portion 6 and the insertion end of the shaft portion 6 of the pin 2 is buried within the insertion hole 7. The pin 2 can move in a drawing out direction within the insertion hole 7 of the grommet 1 in a state where the engagement portion 9 engages with the engagement surface 14.

Figure 4:
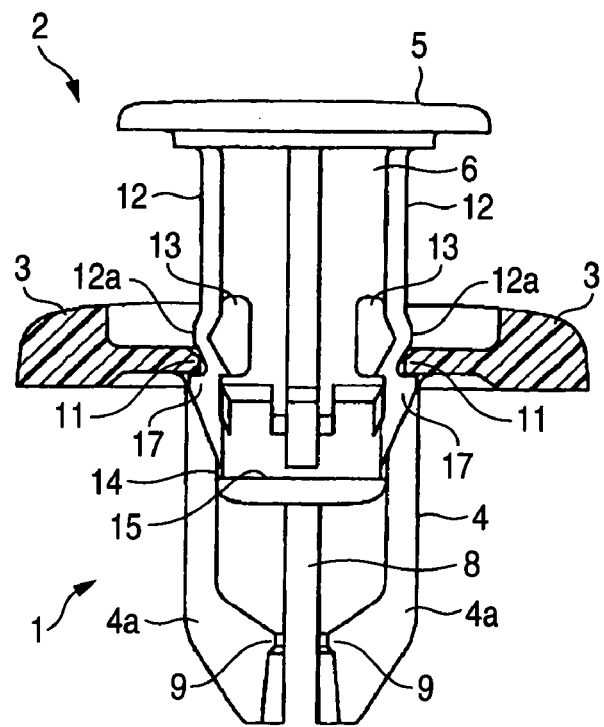
FIG. 4 is a sectional view showing a provisionally engaged state of a grommet and a pin.

In the case of jointing and fixing two panel members P1, P2 to each other by using the jointing member thus configured, the shaft portion 6 of the pin 2 is inserted within the insertion hole 7 of the grommet 1 while coinciding the positional relation between the slits 8 and the rib walls 12. Thus, as shown in FIG. 4, the projection 11 for provisional engagement, which is formed at the hole edge on the flange portion 3 side of each of the slits 8, is elastically engaged with a portion between a root of the elastic arm portion 12a and the projection 17 of the rib walls 12 of the pin 2. As a result, the pin 2 becomes to be provisionally engaged with the grommet 1 with reliability. In this state, each of the divided leg pieces 4a is not yet opened outward.

Figure 5:
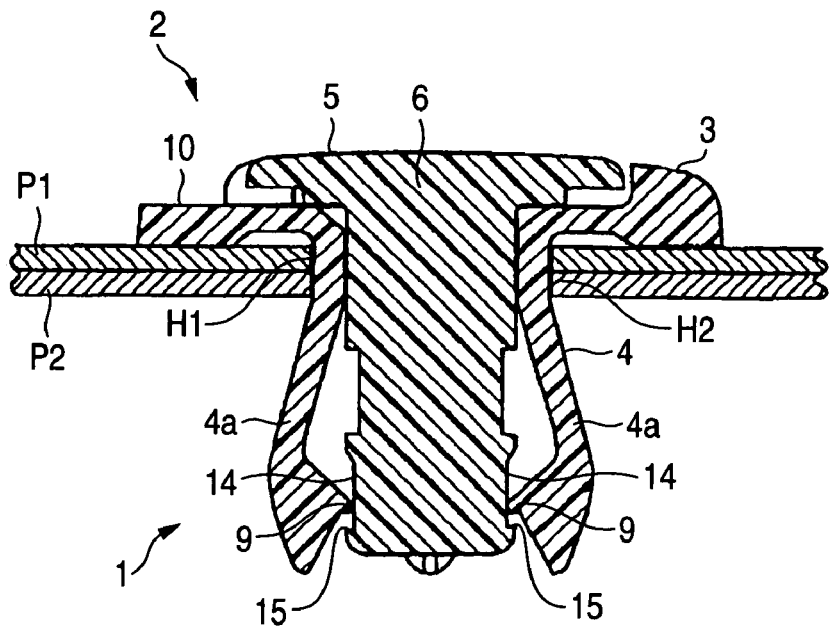
FIG. 5 is a sectional view showing a state where two panel members are jointed and fixed to each other.

After the pin 2 is provisionally engaged, the leg portion 4 of the grommet 1 is attached to attachment holes H1, H2 which are previously perforated at the two panel members P1, P2, and the shaft portion 6 of the pin 2 is completely pushed within the insertion hole 7 until the head portion 5 of the pin 2 abuts against the flange portion 3 of the grommet 1. Then, as shown in FIG. 5, the engagement portion 9 formed at the inner surface of each of the respective divided leg pieces 4a engages with the engagement surface 14 of the pin 2 and simultaneously each of the respective divided leg pieces 4a is opened outward. Thus, the two panel members P1, P2 are jointed and fixed to each other from one direction by one-touch operation.

In the jointed and fixed state of the panel members P1, P2, since the head portion 5 of the pin 2 is restricted to abut against the flange portion 3 of the grommet 1, the engagement portion 9 necessarily engage with the engagement surface 14. In this state, although the engagement portion 9 is not engaged with the lock surface 15, the shaft portion 6 of the pin 2 is allowed to move in its drawing out direction. Therefore, when the shaft portion 6 moves in its drawing out direction, the engagement portion 9 engages with the lock surface 15 for the first time. At the time of disengaging the jointing member by which the panel members P1, P2 are jointed and fixed to each other, since the shaft portion 6 is movable as described above, the insertion end of a disengaging jig can be inserted with a small force between the head portion 5 of the pin 2 and the flange portion 3 of the grommet 1. Thus, it is not necessary to pond on the disengaging jig or forcedly scoop out in order to insert the disengaging jig between the head portion 5 and the flange portion 3, so that the head portion 5 and the flange portion 3 are prevented from being damaged. Further, the joining member itself can be restored to the provisionally engaged state by drawing out the grommet 1 from the pin 2.

Moreover, in the state where the engagement portion 9 engages with the engagement surface 14, the tip end of the shaft portion 6 of the pin 2 is buried within the insertion hole 7 of the grommet 1 and the insertion end does not protrude outward from the end edges of the respective divided leg pieces 4a. Therefore, such a matter can be prevented from occurring that a worker erroneously pushes the insertion end of the shaft portion 6 of the pin 2 while the worker performs another procedure or the corner portion of another part is abutted against the tip end of the shaft portion 6 of the pin 2. Accordingly, there does not arise such a fear of the conventional technique that it is required to perform the jointing and fixing procedure of the panel members P1, P2 again or the panel members may be transferred to the next procedure without being noticed that the jointed and fixed state of the panel members is cancelled. Further, according to the embodiment, in the case that the angle of the corner portion of the other part is about 160 degrees or more, the corner portion merely abuts against the tip end edges of the respective divided leg pieces 4a being opened but does not abut against the insertion end of the shaft portion 6 of the pin 2 buried within the insertion hole 7.

Figure 6:
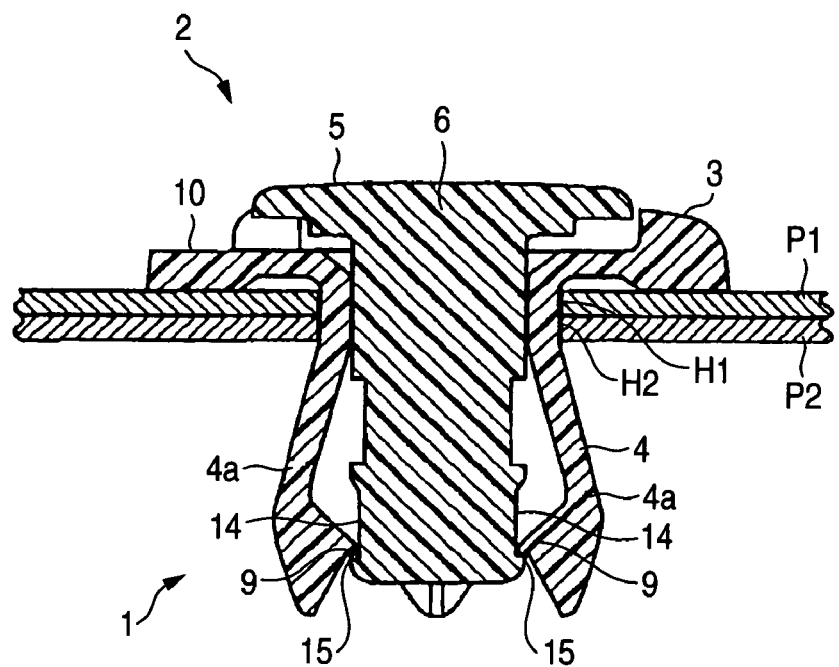
FIG. 6 is a sectional view showing a state where the pin moves in its drawing out direction and an engagement portion on the grommet side engages with a lock surface on the pin side.

If the insertion end of the shaft portion 6 of the pin 2 is pushed by some reason and the pin 2 moves in its drawing out direction within the insertion hole 7, as shown in FIG. 6, the engagement portion 9 of each of the respective divided leg pieces 4a engages with the lock surface 15 while maintaining the opened state of the respective divided leg pieces 4a of the grommet 1. Thus, the pin 2 is surely prevented from being drawn out while effectively absorbing an impact energy due to unexpected external force applied to the pin. As a result, there is no fear that the jointing member itself disengages from the attachment holes H1, H2 of the panel members P1, P2 or the pin 2 restores to the provisionally engaged state even if the jointing member itself does not disengage.

In this case, since the engagement portion 9 is biased to the engagement surface 14 due to the elastic force of the leg portion 4, the engagement portion 9 applies a friction force with respect to the movement of the pin 2 and the friction force which serves as a resistance force for preventing the movement of the pin. Thus, when an unexpected external force acts on the insertion end of the pin 2, an impact energy due to the external force is converted into a kinetic energy of the pin 2, whereby the external force forces the pin 2 to move against the resistance force. Therefore, in the embodiment, the kinetic energy is consumed in accordance with the movement of the pin 2, so that the external force itself can be attenuated.

Further, since the pin 2 can move while maintaining the engaged state between the engagement portion 9 and the engagement surface 14, the engagement portion 9 abuts against the lock surface 15 after the moving speed of the pin 2 reduced. At the time of being abutted, the kinetic energy of the pin 2 applied from the external force is sufficiently attenuated so that the speed of the pin at this time is sufficiently reduced. Thus, even if an engagement area between the engagement portion 9 and the lock surface 15 is small at the time of the abutment, the engagement portion 9 never moves over the lock surface 15.

As a result, the engagement area between the engagement portion 9 and the lock surface 15 can be made small. Consequently, in a procedure of removing the jointing member, the pin 2 and the grommet 1 can be easily restored to the provisionally engaged state like the conventional technique by inserting a disengaging tool such as a slotted screw driver between the head portion 5 of the pin 2 and the tool insertion groove 10 and scooping out therebetween.

Figure 7:
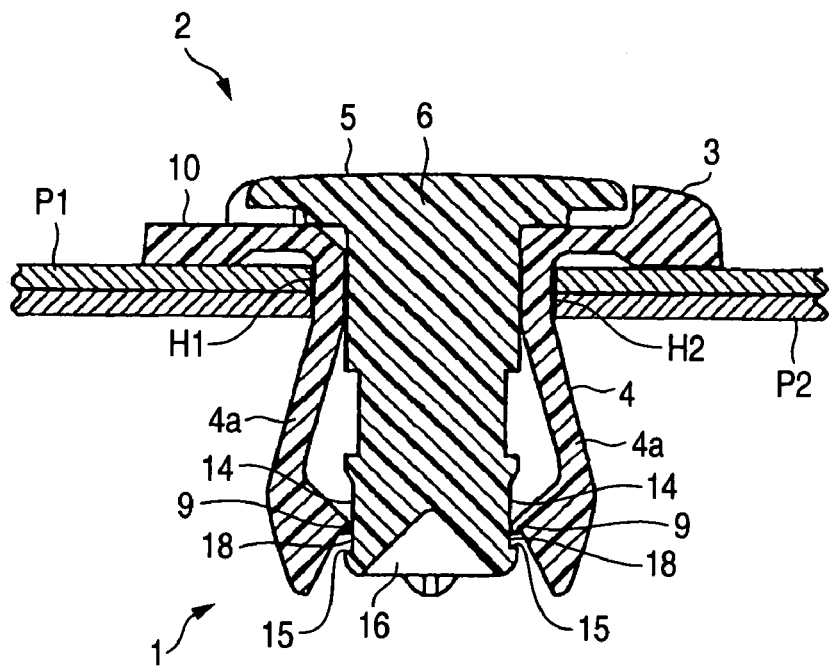
FIG. 7 is a sectional view showing another example of the tip end surface of the shaft portion of the pin.

In the embodiment, although a surface of the tip insertion end of the shaft portion 6 of the pin 2 is formed in a flat plane shape, the insertion end surface of the shaft portion 6 of the pin 2 may be cut in a conical shape 16 as shown in FIG. 7. In this case, even if a worker performs the attachment procedure of another part at the rear side of the jointing member in the jointed state, since a probability that the corner portion of the another part contacts to the tip ends of the divided leg pieces 4a is higher than a probability that the corner portion of the another part contacts to the insertion end surface of the shaft portion 6, the pin 2 is further unlikely affected by an unexpected external force. Further, the jointing member according to the embodiment is configured in a manner that at the time of canceling the jointed and fixed state of the two panel members P1, P2, the pin 2 can be forcedly drawn out from the insertion hole 7 of the grommet 1 by utilizing the tool insertion groove 10 formed at the flange portion 3 of the grommet 1. Thus, as shown in FIG. 7, if a tapered surface 18 is positively applied between the engagement surface 14 and the lock surface 15 formed on the outer periphery of the shaft portion 6 of the pin 2, the drawing out procedure of the pin 2 can be facilitated.

What is claimed is:

1. A jointing member comprising:
   a grommet; and
   a pin,
   wherein the grommet comprises:
      a flange portion;
      a leg portion capable of being opened, in which an insertion hole is formed from a center of the flange portion to an inner portion of the leg portion in which a lower end of the leg portion is opened;
      a plurality of longitudinal slits extending along said leg portion of said grommet to divide said leg portion into a plurality of leg portion pieces; and
      an engagement portion formed at an inner surface of the leg portion,
   wherein the pin comprises:
      a head portion;
      a shaft portion to be inserted into the insertion hole, in which an engagement surface and a lock surface each engagable with the engagement portion, when said shaft portion is inserted into said insertion hole, are formed on the shaft portion; and
      a plurality of longitudinal rib walls formed on an outer periphery of said shaft portion, said plurality of rib walls engaging said plurality of slits, and
   wherein the maximum distance from the flange portion of said grommet to a tip of said leg portion of said grommet is greater than the maximum distance from said head portion of said pin to a tip of said shaft portion of said pin.

2. The jointing member according to claim 1, wherein in a state where the engagement portion formed on the leg portion of the grommet engages with the engagement surface formed at the shaft portion of the pin, the pin is removable from the insertion hole of the grommet.

3. The jointing member according to claim 2, wherein the engagement portion formed on the leg portion of the grommet engages with the lock surface formed on the shaft portion as the engagement portion moves along the lock surface while maintaining an opened state of the leg portion of the grommet.

4. The jointing member according to claim 3, wherein in a state where the engagement portion formed on the leg portion of the grommet engages with the engagement surface formed on the shaft portion of the pin, the tip of the shaft portion of the pin is buried within the insertion hole of the grommet.

5. The jointing member according to claim 2, wherein in a state where the engagement portion formed on the leg portion of the grommet engages with the engagement surface formed on the shaft portion of the pin, the tip of the shaft portion of the pin is buried within the insertion hole of the grommet.

6. The jointing member according to claim 1, wherein the engagement portion formed on the leg portion of the grommet engages with the lock surface formed on the shaft portion as the engagement portion moves along the lock surface while maintaining an opened state of the leg portion of the grommet.

7. The jointing member according to claim 6, wherein in a state where the engagement portion formed on the leg portion of the grommet engages with the engagement surface formed on the shaft portion of the pin, the tip of the shaft portion of the pin is buried within the insertion hole of the grommet.

8. The jointing member according to claim 1, wherein in a state where the engagement portion formed on the leg portion of the grommet engages with the engagement surface formed on the shaft portion of the pin, the tip of the shaft portion of the pin is buried within the insertion hole of the grommet.

9. The jointing member according to claim 1, wherein said engagement portion comprises a protruding portion extending from an inner surface of said leg portion.

10. The jointing member according to claim 1, wherein said engagement portion is formed on an inner surface of an expanded side of said leg portion adjacent to said tip end of said leg portion.

11. The jointing member according to claim 1, further comprising:
    at least one tool insertion groove extending in a radial direction and being formed on an upper surface of said flange portion.

12. The jointing member according to claim 11, wherein said at least one tool insertion groove comprises a plurality of tool insertion grooves.

13. The jointing member according to claim 1, further comprising:
    a projection, for provisional engagement with a portion of one of said plurality of rib walls, being formed on an edge of said slits at an edge of said insertion hole on a side of said slits adjacent to said flange portion.

14. The jointing member according to claim 1, wherein at least one of said plurality of rib walls comprises:
    a bent arm portion formed along said plurality of rib walls.

15. The jointing member according to claim 1, further comprising:
    a rib wall engagement projection formed along each of said plurality of rib walls,
    wherein said provisional engagement projection is engaged between said bent arm portion and said rib wall engagement projection.

16. The jointing member according to claim 1, wherein a distance from said flange portion of said grommet to said engagement portion of said grommet is smaller than a distance from said head portion of said pin to said lock surface of said pin.

17. A jointing member comprising:
    a grommet, said grommet comprising:
       a flange portion;
       a leg portion capable of being opened;
       a plurality of longitudinal slits extending along said leg portion of said grommet to divide said leg portion into a plurality of leg portion pieces;
       an insertion hole formed in said leg portion from a center of the flange portion to an inner portion of the leg portion, said insertion hole comprising:
          a large diameter portion formed at an upper end of said insertion hole adjacent to said flange; and
          a small diameter portion formed adjacent to a bottom portion of said large diameter portion;
       an engagement portion formed on an inner surface of said leg portion; and
       an extending portion, formed on an end of each of said plurality of leg portion pieces distal from said flange portion, which extends to form a pin hole portion whose diameter is smaller than that of the large diameter portion; and a pin, said pin comprising:
- a head portion;
- a shaft portion to be inserted into the insertion hole, in which an engagement surface and a lock surface each engagable with the engagement portion, when said shaft portion is inserted into said insertion hole, are formed on the shaft portion; and
- a plurality of longitudinal rib walls formed on an outer periphery of said shaft portion, said plurality of rib walls engaging said plurality of slits, wherein the shaft portion of the pin further comprises:
- said engagement surface which holds the engagement portion displaced to a radially outward direction to keep the leg portion of the grommet in an opened state, in a state that the pin is incorporated into the grommet, in parallel with a center line of the shaft portion and in a direction of the center line of the shaft portion for a predetermined length; and
- a lock surface which protrudes in a radially outward direction in a tip of the shaft portion so as to prevent the engagement portion from falling away from the engagement surface to shift to a state that a diameter of the leg portion becomes small, wherein the engagement portion of the grommet, and the engagement surface of the pin and the lock surface of the pin are relatively provided in a shaft direction at a position where the grommet and the pin are enabled to slide for a predetermined distance in a state that the grommet and the pin are incorporated to have the leg portion opened, and wherein the maximum distance from the flange portion of said grommet to a tip of said leg portion of said grommet is greater than the maximum distance from said head portion of said pin to a tip of said shaft portion of said pin.

18. The jointing member according to claim 17, wherein the tip of the shaft portion of the pin, which is provided with the lock surface, is surrounded with the extending portion of each of the plurality of leg portion pieces of the grommet in a state that the grommet and the pin are incorporated to have the plurality of leg portion pieces opened, and is inside the tip hole portion of the grommet.

19. The jointing member according to claim 17, wherein the predetermined distance that the grommet and the pin are enabled to slide comprises 0.5 mm to 2 mm.

* * * * *